United States Patent [19]
Michner

[11] 4,149,193
[45] Apr. 10, 1979

[54] FACSIMILE DRIVE WITH DYNAMIC BRAKE

[76] Inventor: James G. Michner, 12 Carriage Hill Cir., Casselberry, Fla. 32707

[21] Appl. No.: 863,891

[22] Filed: Dec. 23, 1977

[51] Int. Cl.² ............................................. H04N 1/36
[52] U.S. Cl. .................................... 358/267; 318/375; 358/277
[58] Field of Search .................. 358/267, 277; 318/87, 318/375, 376, 379

[56] References Cited
U.S. PATENT DOCUMENTS

| | | | |
|---|---|---|---|
| 2,629,844 | 2/1953 | Eserkaln | 318/376 |
| 3,218,529 | 11/1965 | Evans | 318/87 |
| 3,335,351 | 8/1967 | Morris | 318/375 |

Primary Examiner—Howard W. Britton
Attorney, Agent, or Firm—N. L. Norris

[57] ABSTRACT

In a facsimile transceiver, the scanning drum is driven by a DC motor which is coupled to a source of drive pulses having a duty cycle which controls the speed of the DC motor. Dynamic braking pulses are applied to the motor between the drive pulses. The braking current pulses are generated as a result of armature counter EMF and flow through a low impedance path around the DC motor.

10 Claims, 4 Drawing Figures

FACSIMILE DRIVE WITH DYNAMIC BRAKE

BACKGROUND OF THE INVENTION

This invention relates to facsimile units including transmitters, receivers or transceivers. More particularly, this invention relates to a system where a document is scanned in a facsimile transmitter or transceiver to generate electrical information-bearing signals representing dark-light variations in the document being scanned. These information-bearing signals are transmitted over a communications network to a facsimile receiver or transceiver where the information-bearing signals are converted to marks or images on the copy medium so as to form a copy which is a facsimile of the original document.

In my copending application Ser. No. 622,215, filed Oct. 14, 1975, I disclosed a facsimile transceiver comprising a rotatably mounted drum and an information transducer juxtaposed to the drum for marking on a copy medium carried by the drum or detecting dark-light variations in a document carried by the drum. The drum is driven by a DC motor with the speed of the motor controlled by a phase comparison of tachometer pulses and reference pulses.

In copending application Ser. No. 622,214, filed Oct. 14, 1975, and assigned to the assignee of this invention, a DC motor is also utilized to drive a rotatable drum of a facsimile transceiver. The square wave output voltage responsive to the comparison between the tachometer pulses and the reference pulses is applied to the DC motor where the square wave has a duty cycle of approximately 50% when the frequency of the reference pulses corresponds to the frequency of the tachometer pulses. Thus, as the duty cycle of the square wave increases (or decreases) the duration of the drive pulses in the square wave increases (or decreases) and the duration of coasting between drive pulses decreases (or increases). In this manner, the speed of the DC motor is controlled to achieve reference pulses and tachometer pulses of substantially the same frequency.

In the facsimile motor drive circuits described in the aforesaid applications, the period of coasting between motor drive pulses represents a period in which the motor is essentially out of control. This out-of-control condition characteristically produces a jitter or oscillation in the drum of the facsimile transceiver as the drum seeks to maintain a desired frequency or speed, i.e., the drum fails to maintain the desired speed but rather jitters or oscillates about the desired speed. Such jitter or oscillation adversely affects the facsimile. The problem becomes particularly severe where the inertia of the drum is high and friction is low and the drum and motor are slow to decelerate to the desired speeds. The problem is worst at relatively high scanning speeds.

SUMMARY OF THE INVENTION

It is an object of this invention to provide a DC motor drive which is not characterized by jitter and oscillation.

It is a further object of this invention to provide a facsimile DC motor drive which is capable of functioning at relatively high scanning speeds.

In accordance with these and other objects of the invention, a method and apparatus is provided for driving a scanning means including a DC motor associated with a facsimile unit. The DC motor is driven with a pulsating drive signal comprising a plurality of drive pulses applied to the DC motor during the duty cycle of the pulsating drive. The DC motor is braked by a pulsating braking signal comprising a plurality of braking current pulses which are applied to the DC motor between the drive pulses.

In accordance with one important aspect of the invention, the braking current pulses are substantially coincident in time to the spaces between the drive current pulses. Preferably, the braking current pulses are generated by the counter EMF and flow through a low impedance path or short circuit around the motor.

In the preferred embodiments of the invention, brake means comprises semiconductor means which creates the low impedance path or short circuit. In one embodiment of the invention, the semiconductor means is responsive to a drive control signal. In another embodiment of the invention, the semiconductor means is coupled to the counter EMF of the motor so as to permit the counter EMF to control the braking current pulses.

DETAILED DESCRIPTION OF THE PREFERRED EMBODIMENTS

Figure 1:
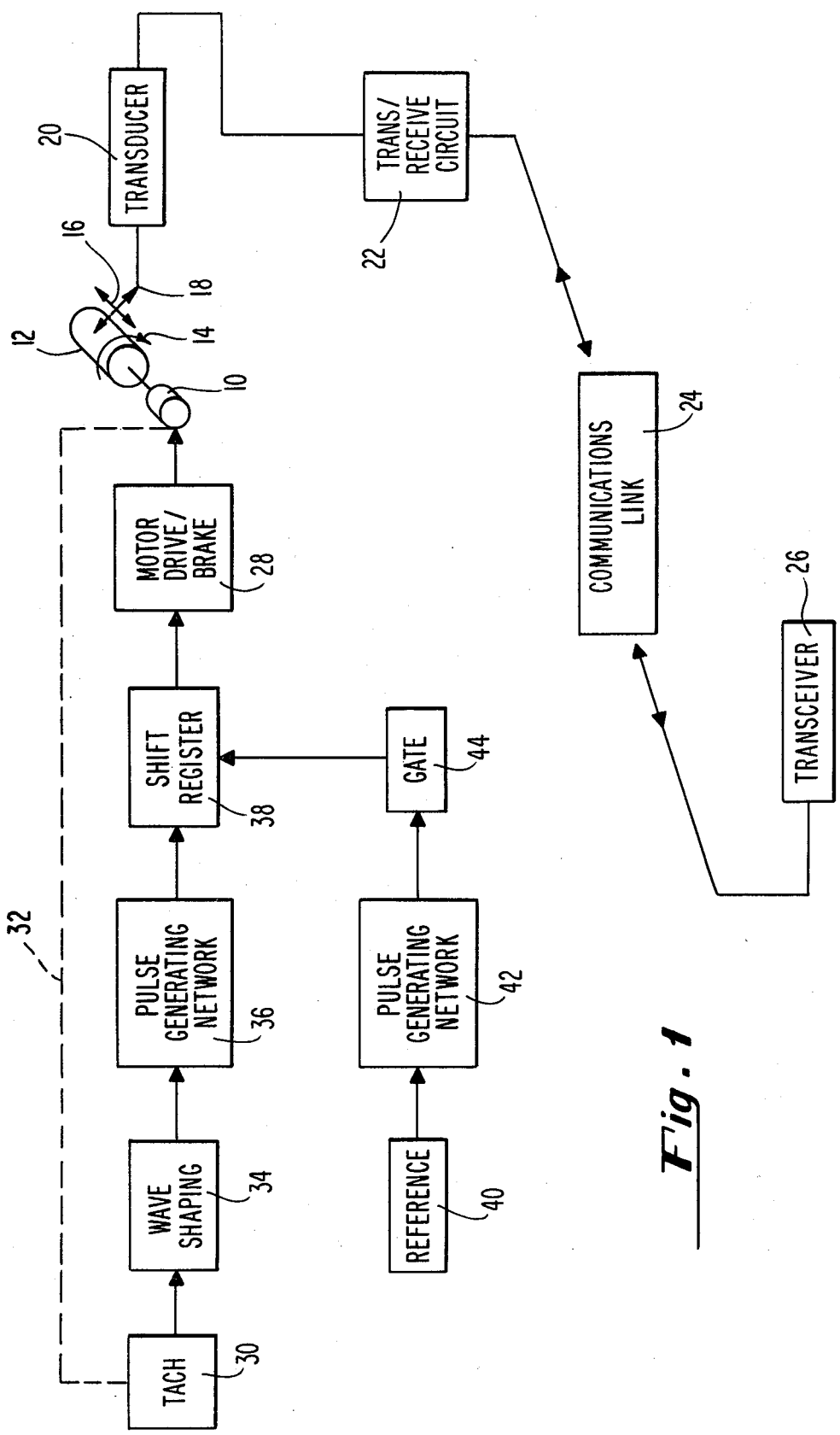
FIG. 1 is a partially schematic, block diagram depicting a facsimile transmitting and receiving system wherein the scanning motor of each transmitter, receiver or transceiver is driven and braked in accordance with the principles of this invention.

Referring now to FIG. 1, a first facsimile transceiver comprises a rotatably mounted drum 12 rotatably driven by a motor 10 in a direction depicted by an arrow 14 so as to create a relative scanning movement between a document or copy medium carried by the drum 12 and a scanning head not shown as the head assumes various scanning positions. As the scanning head is advanced axially along the drum 12 as indicated by an arrow 16 and the drum rotates about its axis as indicated by an arrow 14, successive paths in the document or copy medium are placed in communication as depicted by a line 18 with suitable transducer means such as a photodetector and stylus not shown.

When the transceiver is operating in a transmit mode, the photodetector of the transducer 20 detects variations in light intensity due to the reflectivity of the document as the document is being scanned by the photodetector via a path of optical communication as depicted by the line 18. The output from the photodetector of the transducer 20 is then applied to the transmission circuit of a transmit/receive circuit 22. When the transceiver is operating in a receiving mode, the transmit/receive circuit demodulates signals representing dark-light variations in a remotely located document and the output of the transmit/receive circuit 22 is applied to the transducer 20 for energizing the stylus thereof so as to mark on the copy medium carried by the drum 12 in the area of communication as depicted by the line 18.

The transmit/receive circuit 22 is connected to a suitable communications link 24 by suitable coupling means, e.g., direct coupling or acoustic coupling. The communications link 24 provides a connection to another transceiver 26 of a similar function and design.

As shown in FIG. 1, the motor 10 is rotatably driven by a novel motor drive/brake circuit 28 constructed in accordance with the principles of this invention which forms part of a phase-locked loop. The phase-locked loop comprises a tachometer 30 which may comprise a winding coupled to a rotating permanent magnet armature of the motor 10 as depicted by a broken line 32. The output from the winding of the tachometer 30 is applied to a waveshaping network 34. The pulse generating network 36 is coupled to the output of the waveshaping network 34 so as to form pulses which are applied to shift register 38 for phase comparison with reference pulses. The reference pulses are generated by a source or reference 40 such as a crystal clock or other suitable means of reference frequency including the AC power line frequency. The output from the reference 40 is coupled to a pulse generating network 42 and a gate circuit 44 which applies the reference pulses to the shift register 38.

The output from the shift register 38 is a series of motor drive control pulses which form a square wave as disclosed in the aforesaid pending application Ser. No. 622,214, which is incorporated herein by reference. This square wave is utilized by the motor drive/brake circuit 28 as will now be described in detail which reference to the embodiment shown in FIG. 2.

Figure 2:
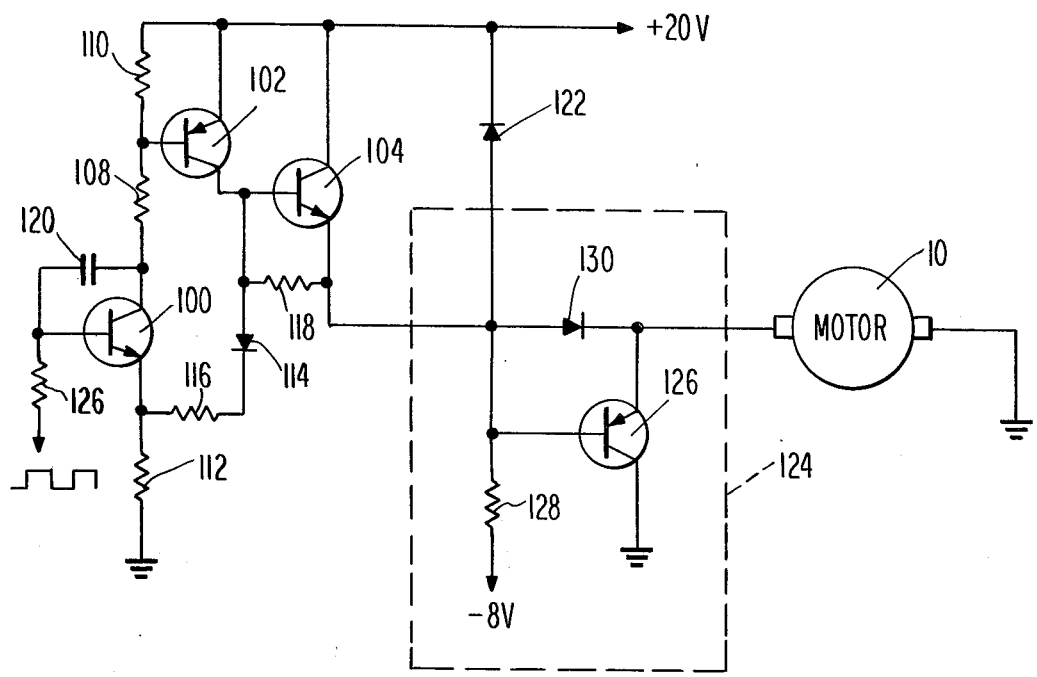
FIG. 2 is a schematic circuit diagram of the motor drive/brake circuit depicted in block form in FIG. 1 representing one embodiment of the invention.

As shown in FIG. 2, a motor drive/brake circuit 28 comprises three semiconductor devices in the form of transistors 100, 102 and 104 which are coupled to the output of the shift register 38 shown in FIG. 1 through a resistor 106. The collector of the transistor 100 is coupled to the base of the transistor 102 through a resistor 108. The resistor 108 and the base of the transistor 102 are in turn connected to a +20 volt power supply through a resistor 110 while the emitter of the resistor 100 is connected to ground through a resistor 112.

The collector of the transistor 102 is connected to the base of the transistor 104. In order to regulate the voltage applied to the DC motor 10, a voltage regulating network comprises a diode 114, a resistor 116 and a resistor 112 in the emitter circuit of the transistor 100. A resistor 118 connected between the emitter and the base of the transistor 104 serves to shunt base-to-collector leakage. A capacitor 120 connected between the base and the collector of the resistor 100 provides high frequency attenuation and stability in the voltage regulator portion of the circuit. A clamping diode 122 is connected between the emitter of the transistor 104 and the +20 volt power supply.

The square wave drive control signals applied to the base of the transistor 100 through the resistor 106 produce a pulsating or square wave drive voltage which is applied to the motor 10. The positive going pulses at the emitter of the transistor 104 apply the drive voltage to the motor 10.

In accordance with this invention, dynamic braking current pulses provided by the counter EMF of the motor 10 are applied to the motor between drive pulses. In this connection, a dynamic braking circuit 124 comprises a braking semiconductor control device in the form of a transistor 126 having a base connected to a −8 volt power supply through a resistor 128 and a collector connected to ground. The emitter of the transistor 126 is connected to the junction of a diode 130 and the motor 10. Between the application of positive going pulses of the square wave drive voltage applied to the motor 10 through the diode 130, the counter EMF of the motor 10 produces a voltage drop across the diode 130 so as to permit the base of the transistor 126 to go sufficiently negative with respect to ground and thereby permit the transistor 126 to saturate forming a short circuit or low impedance path around the motor 10. This allows the counter EMF of the motor to generate braking current pulses which flow through the short circuit between drive pulses which are applied to the motor 10 so as to permit the motor to be decelerated at a faster rate than the load friction can provide. Because the counter EMF increases with motor speed, the braking is still effective at high speeds. Accordingly, even where the inertia of the drum is high and friction is low, high deceleration rates may be achieved when the drive pulse is removed so as to allow the system to declerate to the desired speed as effectively as it accelerates.

Reference will now be made to the waveform of FIG. 4A which depicts the voltage applied to the base of the transistor 126. As shown, the voltage applied to the base of the transistor 126 varies between approximately 0 volts and +15 volts in a substantial square wave so as to produce a motor voltage waveform as depicted by FIG. 4B. It will be noted that the voltage waveform of FIG. 4B varies between 0 and +14.5 volts with the voltage falling to a −.7 volt at the onset of braking and to +15 volts at the onset of the drive pulses. In the absence of the dynamic braking provided by the transistor 126 under the control of the counter EMF of the motor 10, the voltage waveform of the motor would rise to approximately 7 volts between drive pulses. It will therefore be understood that the braking circuit 124 is capable of maintaining the voltage across the motor 10 at approximately 0 volts so as to effectively decelerate and prevent coasting of the motor 10. Of course, this braking is accomplished at the sacrifice of some power across the resistor 128.

Reference will now be made to the motor drive/brake circuit depicted in FIG. 3 wherein the power consumed by the dynamic braking is reduced.

Figure 3:
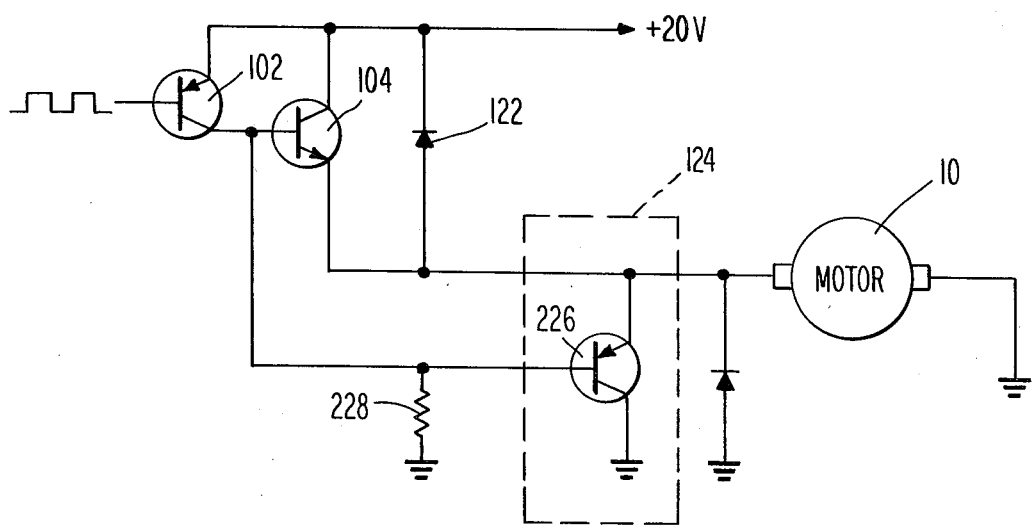
FIG. 3 is a schematic diagram of another motor drive/brake circuit which represents another embodiment of this invention.

Referring now to FIG. 3, a brake circuit 224 will be described in which the control of a transistor 226 at the brake circuit 224 is under the control of the square wave input which controls the drive transistors 102 and 104. In this regard, it will be noted that a resistor 228 connected between the base of the transistor 226 and ground will produce a voltage change which will bias the transistor 226 into saturation when the drive transistors 102 and 104 are non-conductive. The saturation of the transistor 226 creates a short circuit across or around the motor 10 as in the embodiment of FIG. 2 so as to permit the braking current pulses generated by the counter EMF to pass therethrough.

Figure 4:
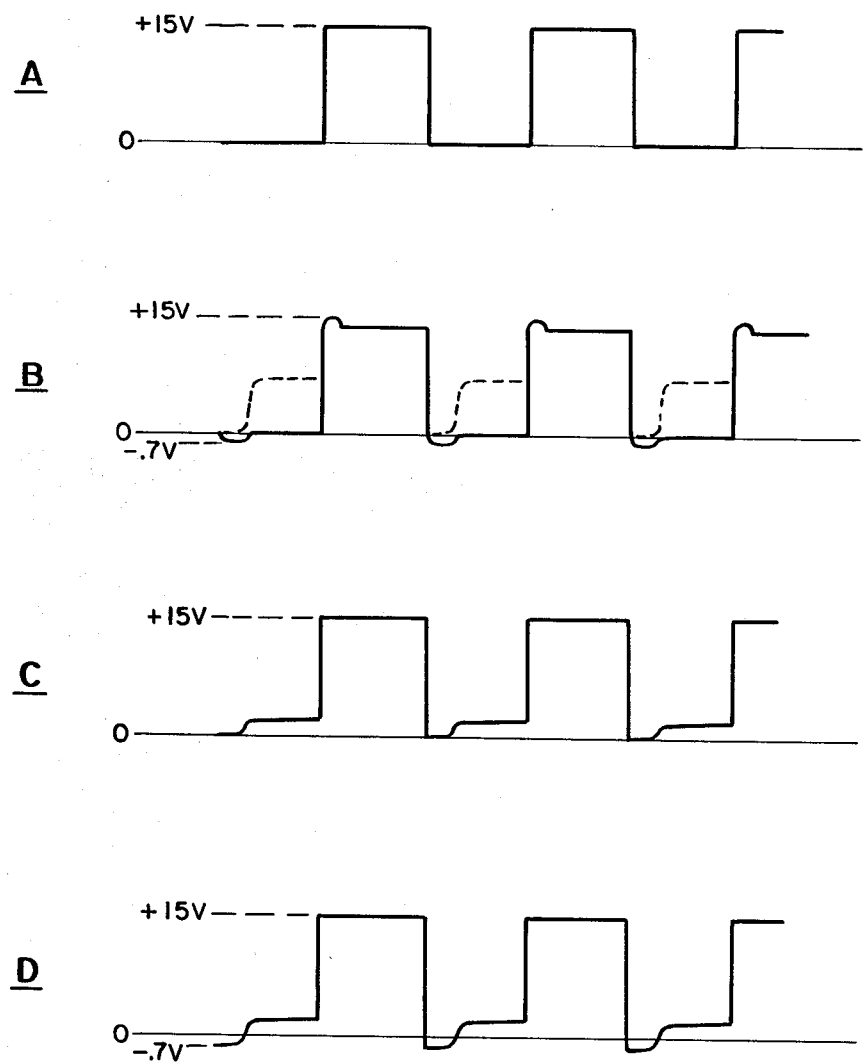
FIG. 4 is a series of waveforms used in describing the circuitry of FIGS. 2 and 3.

Referring now to FIG. 4C, it will be seen that the voltage applied to the base of the transistor 226 rises slowly from below 0 volts to a +2 volts during the braking period. Consequently, the voltage waveform of the motor itself as shown in FIG. 4D rises during that same period so as to produce a slightly less effective braking current as compared with the circuit of FIG. 2 but with a lesser power consumption.

From the foregoing, it will be understood that the braking current pulses generated by the counter EMF of the motor are substantially coincident in time with the spaces between the drive pulses. Therefore, the duration of the braking current pulses varies inversely with the duration of the drive current pulses.

In the foregoing specification, it has been suggested that the motor drive/brake circuit may be utilized in conjunction with the DC motor coupled to the scanning drum of a facsimile transceiver. It will be understood that the same DC motor drive might be utilized in connection with other scanning apparatus in facsimile receivers, transmitters and transceivers. For example, it would be possible to employ such a DC motor combination with the motor drive/brake circuit of this invention for use with a flat-bed scanner.

Therefore, it will be understood that although a specific embodiment has been shown and described, various modifications will occur to those of ordinary skill in the art and such modifications will fall within the true spirit and scope of the invention as set forth in the appended claims.

What is claimed:

1. A facsimile unit comprising scanning means, information transducer means associated with the scanning means for scanning through various positions, and scanning drive means for driving the scanning means, said scanning drive means comprising a DC motor and a source of a pulsating drive voltage coupled to said DC motor for applying drive pulses to said DC motor during the duty cycle of the pulsating drive voltage, the improvement in said scanning drive further comprising
dynamic brake means for intermittently applying a pulsating braking current comprising brake pulses between said drive pulses.

2. The facsimile unit of claim 1 wherein said dynamic brake means increases braking current as the speed of said scanning means increases.

3. The facsimile unit of claim 1 wherein said dynamic brake means forms a short circuit around said motor between said drive pulses and the pulsating braking current is generated by the counter EMF of said DC motor.

4. The facsimile unit of claim 3 further comprising brake control means for generating said pulsating braking current in response to the counter EMF of the motor.

5. The facsimile unit of claim 3 further comprising signal means for generating a pulsating drive control signal:
drive control means coupled to said signal means for generating said pulsating drive in response thereto; and
brake control means coupled to said signal means for generating said pulsating braking current in response thereto.

6. A facsimile unit comprising scanning means, information transducer means associated with said scanning means for scanning through various positions, and scanning drive means for driving said scanning means, said scanning drive comprising a DC motor and a source of pulsating drive coupled to said DC motor for applying drive pulses to said DC motor during the duty cycle of the pulsating drive, reference means for generating a reference signal representing the desired scanning speed of said scanning means, detector means for generating a speed indicative signal representing the actual scanning speed, and comparison means for comparing the reference signal and the speed indicative signal and varying the duty cycle of the pulsating drive so as to reduce the difference between the desired scanning speed and the actual scanning speed, the improvement in said scanning drive further comprising:
dynamic brake means for intermittently applying pulsating braking current comprising braking pulses between said drive pulses, the duration of said braking pulses varying inversely with the duty cycle of said pulsating drive so as to further reduce the difference between the desired scanning speed and the actual scanning speed.

7. In a facsimile unit, a method of driving scanning means including a DC motor associated with the information transducer means and document and/or copy means comprising:
driving the DC motor with a pulsating drive voltage comprising a plurality of drive pulses applied to the DC motor during the duty cycle of the pulsating drive signal; and
braking the DC motor with a pulsating braking current comprising a plurality of braking current pulses applied to the DC motor between the drive pulses.

8. The method of claim 7 wherein braking pulses are substantially coincident in time to the spaces between the drive current pulses.

9. The method of claim 8 wherein the braking pulses are provided by the counter EMF of the motor.

10. The method of claim 7 wherein the duty cycle of the pulsating drive is varied to maintain a desired scanning speed and the duration of the braking pulses is varied inversely with the duration of the drive current pulses.

* * * * *